US008972386B2

(12) United States Patent
Curtis et al.

(10) Patent No.: US 8,972,386 B2
(45) Date of Patent: *Mar. 3, 2015

(54) DYNAMIC ROUTING OF INSTANT MESSAGE

(71) Applicant: International Business Machines Corporation, Armonk, NY (US)

(72) Inventors: Hana Curtis, Brooklin (CA); Kenny P. Maycock, Lucan (IE)

(73) Assignee: International Business Machines Corporation, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/680,141

(22) Filed: Nov. 19, 2012

(65) Prior Publication Data

US 2014/0143348 A1 May 22, 2014

(51) Int. Cl.
*G06F 7/00* (2006.01)
*G06F 17/30* (2006.01)

(52) U.S. Cl.
USPC .......................................... 707/722; 707/726

(58) Field of Classification Search
None
See application file for complete search history.

(56) References Cited

U.S. PATENT DOCUMENTS

| 7,191,233 | B2 | 3/2007 | Miller |
| 7,720,082 | B2 | 5/2010 | Fridman et al. |
| 7,809,842 | B2 | 10/2010 | Moran et al. |
| 2005/0037762 | A1 | 2/2005 | Gurbani et al. |
| 2005/0170847 | A1 | 8/2005 | Karlsson et al. |
| 2006/0259565 | A1 | 11/2006 | Cheung et al. |
| 2007/0087731 | A1 | 4/2007 | Karlsson et al. |
| 2007/0162605 | A1 | 7/2007 | Chalasani et al. |
| 2008/0045246 | A1 | 2/2008 | Murtagh et al. |
| 2008/0051094 | A1 | 2/2008 | Maki et al. |
| 2008/0177848 | A1 | 7/2008 | Wakhlu |
| 2009/0063690 | A1 | 3/2009 | Verthein et al. |
| 2010/0069095 | A1 | 3/2010 | Yahav et al. |
| 2012/0066340 | A1* | 3/2012 | Armstrong et al. ........... 709/217 |
| 2012/0331404 | A1* | 12/2012 | Buford et al. ................. 715/757 |

FOREIGN PATENT DOCUMENTS

EP     2184932 B1   5/2011

OTHER PUBLICATIONS

Disclosed Anonymously; "Method and System for Switching Communication Channels for Maintaining Continuity in Instant Messaging (IM) Sessions"; IP.com Prior Art Database; Electronically Published Jan. 4, 2012; IPCOM000213894D.

* cited by examiner

*Primary Examiner* — Tony Mahmoudi
*Assistant Examiner* — Tuan A Pham
(74) *Attorney, Agent, or Firm* — Ryan Lewis; Arnold Bangali

(57) ABSTRACT

A computer system executes an instant message session in a host message program of a first collaborative tool between users. The computer system executes the instant message session in a participant message program of a second collaborative tool. The computer system further receives a first request from the users to automatically or manually route the instant messages of the instant message session from the host message program of a mobile message program of a third collaborative tool. The computer system further transmits the instant messages from the host message program to the mobile message program based on conditions. The computer system further receives a second request from the mobile message program to route the instant message of the instant message session from the mobile device. The computer system transmits the instant message session based on the second request.

11 Claims, 7 Drawing Sheets

DYNAMIC ROUTING OF INSTANT MESSAGE

FIELD OF THE INVENTION

The present invention relates generally to messaging communication systems, and more particularly to manual and automatic re-routing of instant messages from computing devices to mobile devices and to re-routing the instant messages from the mobile devices to the computing devices.

BACKGROUND

The Information Age, also known as the Digital Age or Computer Age is characterized by the ability to generate, process, transfer, and share information in a negligible amount of time. Furthermore, wireless communication services conducted on a network of computing systems over the Internet have played an important role in technical progression of the Information Age. In addition, wireless communication services are continually becoming more widely used and more versatile. Moreover, some wireless communication services have the ability to transfer wireless communication, including, for example, text message using short message service (SMS) on mobile computing devices.

Furthermore, instant messaging (IM) mobile solutions can enhance conventional SMS wireless communication. For example, Mobile Instant Messaging (MIM) can enhance SMS through the use of suitable Internet Protocol (IP) technology and presence information. Moreover, the mobile industry includes one or more of SMS and IM clients, and SMS Centers (SMSCs) and IM enablers to service SMS and IM clients. In addition, as SMS becomes more and more widespread, it is likely to be relied on for wirelessly transmitting messages in a broad spectrum of computing technologies over the Internet.

SUMMARY

In one embodiment, a method for routing instant messages between collaborative tools. The method comprises a computer system executing an instant message session in a host message program of a first collaborative tool of one or more collaborative tools between one or more users of one or more collaborative tools. The method further comprises of the computer system executing the instant message session in a participant message program of a second collaborative tool of one or more collaborative tools. The method further comprises of the computer system receiving a first request from one or more users of the host message program to route one or more instant messages of the instant message session from the host message program to a mobile message program of a third collaborative tool of one or more collaborative tools. The method further comprises of the computer system transmitting one or more instant messages from the host message program to the mobile message program based on conditions defined in the host message program. The method further comprises of the computer system receiving a second request from one or more users of the mobile message program to route one or more instant messages of the instant message session from the mobile message program to the host message program of one or more collaborative tools. The method further comprises of the computer system transmitting one or more instant messages from the mobile message program to the host message program based on the second request.

In another embodiment, a computer system is provided for routing instant messages between collaborative tools. The computer system comprises of one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to execute an instant message session in a host message program of a first collaborative tool of one or more collaborative tools between one or more users of the one or more collaborative tools. The computer system further comprises program instructions to execute the instant message session in a participant message program of a second collaborative tool of one or more collaborative tools. The computer system further comprises program instructions receive a first request from one or more users of the host message program to route one or more instant messages of the instant message session from the host message program to a mobile message program of a third collaborative tool of one or more collaborative tools. The computer system further comprises program instructions to transmit one or more instant messages from the host message program to the mobile message program based on conditions defined in the host message program. The computer system further comprises program instructions to receive a second request from one or more users of the mobile message program to route one or more instant messages from the mobile message program to the host message program of tone or more collaborative tools. The computer system further comprises program instructions to transmit one or more instant messages from the mobile message program to the host message program based on the second request.

In another embodiment, a computer program product is provided for routing instant messages between collaborative tools. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to execute an instant message session in a host message program of a first collaborative tool of one or more collaborative tools between one or more users of one or more collaborative tools. The computer program product further comprises program instructions to execute the instant message session in a participant message program of a second collaborative tool of one or more collaborative tools. The computer program product further comprises program instructions to receive a first request from one or more users of the host message program to route one or more instant messages from the host message program to a mobile message program of a third collaborative tool of one or more collaborative tools. The computer program product further comprises program instructions to transmit one or more instant messages from the host message program to the mobile message program based on conditions defined in the host message program. The computer program product further comprises program instructions to receive a second request from one or more users of the mobile message program to route one or more instant messages from the mobile message program to the host message program of one or more collaborative tools. The computer program product further comprises program instructions to transmit the one or more instant messages from the mobile message program to the host message program based on the second request.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein, like reference numerals indicate like components, and:

DETAILED DESCRIPTION

Figure 1:
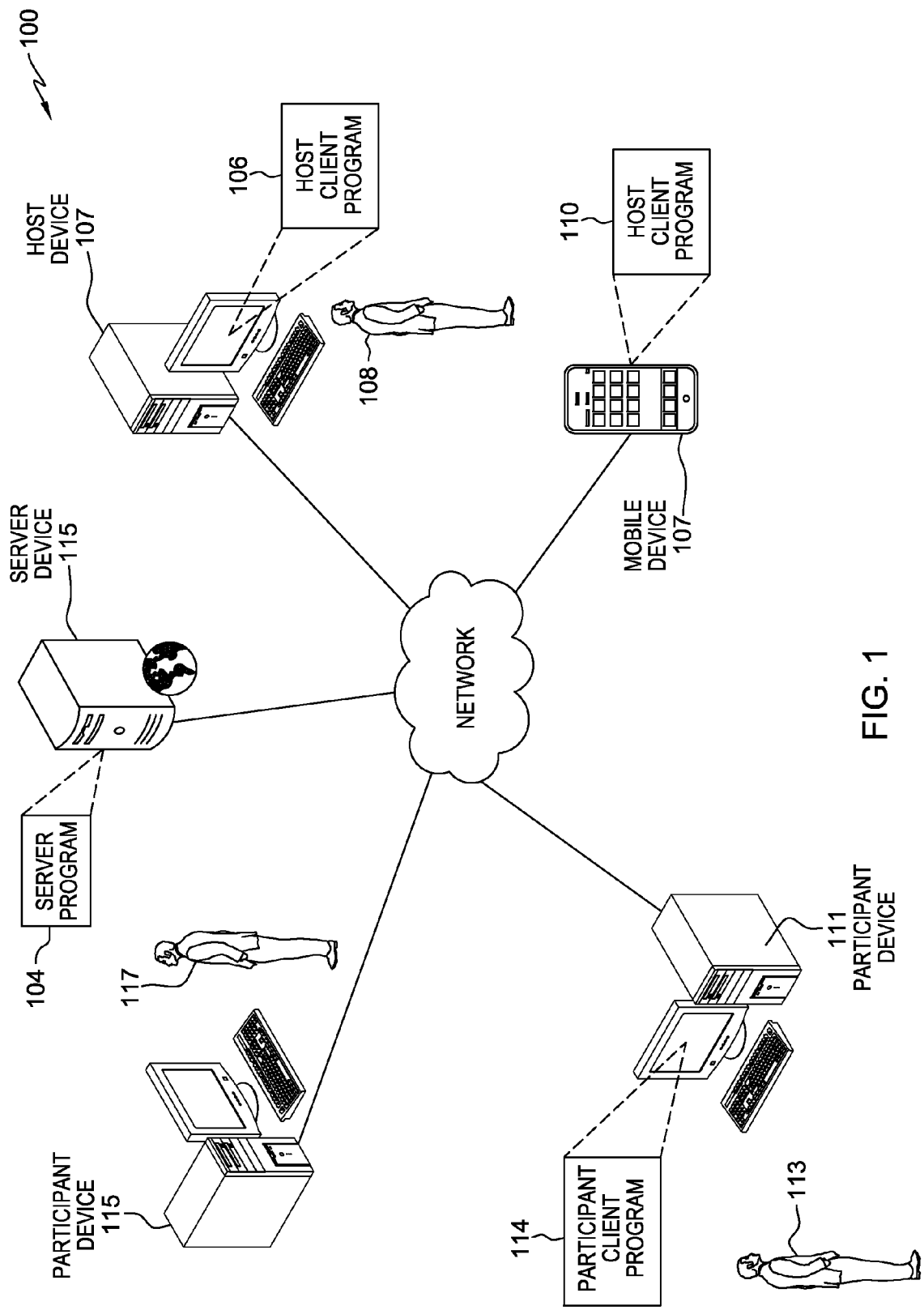
FIG. 1 is a functional block diagram of a dynamic messenger routing system in accordance with embodiments of the present invention.

Embodiments of the present invention comprise of one or more circuits or subassemblies of circuits, as well as methods of operation that are executed to allow hosts or participants of an instant message program of one or more computing devices to manually or automatically re-route existing or new instant message conversations from a host instant message program of one or more host devices to a mobile instant message program of one or more mobile devices, and/or alternatively, re-routing the instant message conversations from the mobile instant message program to the host instant message program based one or more configurations defined in the host instant message program of the host device.

For example, an instant message conversation is initiated on either or both of the host device and a participant device. Furthermore, during the conversation host steps away from the host device and elects to continue the instant message conversation with participant on a SMS program of a mobile device. A server computing system automatically re-routes the instant message conversation to the SMS program of the mobile device of host based on the defined configurations. Moreover, the instant message conversation continues on the SMS program of the mobile device between both host and participant uninterrupted. Host can also elect to re-divert or re-route the instant message from the mobile device, back to the host device during the instant message conversation. Further, a complete conversation history of the instant message conversion is maintained within the server computing system including, for example a record of instant message transmissions between host device, mobile device and participant device during the instant message conversations.

According to embodiments of the present invention, the mobile instant message program can be a SMS or any mobile service that is capable of re-routing instant message between computing device in accordance with embodiments of the present invention. Short messaging is a form of communication mode that is typically used in a mobile network. The mobile instant message program can also be any mobile instant message program that is adapted to re-route the instant message conversations, from the one or more mobile devices to the one or more computing devices.

In addition, the configurations for re-routing of the instant message conversations from the host message program to the mobile message program, and vise versa, include, for example, allowing the host to control when and how instant messages are or should be diverted to the mobile message program, and/or from the mobile message program to the host message program. The configurations further include, storage of mobile devices numbers of the host in a database of a server device, permitted schedules, including, times in which participants can continue instant message conversations with host in the event that host diverts the instant message conversations from the host device to the mobile device.

In one aspect, the mobile device numbers are stored in the sender or receiver's messaging profile in a database repository. Therefore automatic or manual re-routing of instant messages between instant message programs of one or more computing devices and mobile messaging programs of one or more mobile devices, executed automatically by a server program of the database repository, can be performed as described in more details below, in accordance with embodiments of the present invention. Furthermore, either the hosts or participants also have the capability to manually control whether to allow conversation continuance of the instant message session on the mobile message program of the mobile device, as described in more details below. Moreover, the instant message program of one or more computing devices or mobile message program of one or more mobile devices can also be combined with a presence service to allow the senders or receivers to view an online state of the sender or receiver in real time, in accordance with embodiments of the present invention.

Further aspects of the present invention will now be described in conjunction with the Figures. Referring to FIG. 1, dynamic messenger routing system 100, for manual or automatic re-routing or diversion of Instant Messenger (IM) messages from one or more host computing devices to one or more mobile devices, is shown. In particular, dynamic messenger routing system 100 comprises network 102, host device 107, mobile device 109, participant devices 111, 115 and server device 105.

Host device 107, mobile device 109, participant devices 111, 115 are clients to server device 105, interconnected over network 102. Host device 107, mobile device 109, participant devices 111, 115 operate over network 102 with server device 105 to facilitate manual or automatic diversion of IM messages between host device 107, mobile device 109, participant devices 111, 115. Furthermore, host device 107, mobile device 109, participant devices 111, 115 are equipped to transmit or re-route instant messages and/or SMS messages addressed to either of, host device 107, mobile device 109, participant devices 111, 115, collaboratively, based on configurations defined in a host message program of host device 107, and stored in a database of server device 105.

In one aspect, host device 107, participant devices 111, 115, and mobile device 109, are collaborative tools that are adapted to transmit instant messages during instant message sessions, conducted between, for example, host 108, and participants 113, 117. The depicted embodiment further includes host 108 and participant 113, 117. In one aspect, both host 108 and participants 113, 117, are engaged in an instant message session transmitted between host device 107, mobile device 109, participant devices 111, 115, in accordance with embodiments of the present invention.

The depicted embodiment can also include additional host devices, participant devices, or mobile devices, additional hosts or participants, engaged in diversion or re-routing instant messages automatically or manually based on configurations to divert or re-route the instant messages hosted between host device 107, mobile device 109, and participant devices 111, 115. The configurations can include host preferences for routing or re-routing instant messages via a host message program host device 107. Moreover, the configurations can be defined by host 108 in a user interface of a client messaging program of host device 107. In particular, specific configurations can include, for example, allowing diversion of the IM messages from host device 107 to mobile device 109 if a user, for example, host 108 is idle or away from host device 107.

The IM messages are diverted from host device 107 to mobile device 109, and/or, alternatively, from mobile device 109 to host device 107, according to embodiments of the present invention. Moreover, rules of re-routing messages in dynamic messenger routing system 100, between host device 107, mobile device 109, participant devices 111, 115, can be interchangeable, as described in more details below, in accordance with embodiments of the present invention. Host device 107 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Host device 107 comprises host client program 106. Host device 107 comprises host client program 106. Host client program 106 allows host 108 to configure options on host client program 106 that allows manual or automatic transmission of instant messages from host device 107 to mobile device 109.

Mobile device 109 can be a handheld device or handheld computer, including, for example, a personal digital assistant (PDA), or a smart phone, such as, for example, Blackberry® or iPhone®, respectively. Mobile device 109 includes mobile client program 110. Mobile client program 110 operates with an operating system of mobile system application, including for example a short message servicing system.

The mobile system application of mobile client program 110 allows host 108 or participants 113, 117 to collaboratively transfer instant messages between host device 107, participant devices 111, 115, and mobile device 109, in the event that the instant messages are configured in host client program 106 to be diverted or re-routed from host device 107 to mobile device 109, during IM sessions between host 108 and participants 113, 117, in accordance with embodiments of the present invention. Mobile client program 110 utilizes a SMS, as described in further details below. SMS includes a standardized communications protocol that allows exchange of short text messages between fixed lines, including for example, host device 107, mobile device 109, and participant device 111, 115. In one embodiment, the conversations hosted in IM sessions between host 108 of host client program 106 and participants 113, 117 of participant client program 114, can be displayed as a SMS thread on mobile device 109. Specifically, the SMS message is relayed to mobile client program 110, and is displayed as a part of the IM session to either the host 108 or participants 113, 117, as explained in more details below. IM messages between host 108 of host device 107 and participants 113, 117 of participant devices 111, 115, can be transmitted to mobile client program 110 of mobile device 109, using an active point to point call of mobile device, a wireless headset device, or a wireless Bluetooth device.

Participant devices 111, 115 are personal computers for sending and receiving instant messages. Participant devices 111, 115 can be, for example, a laptop, tablet, or notebook personal computer (PC), a desktop computer, a mainframe or mini computer. In one embodiment of the present invention, participant devices 111, 115 can further include other computing devices, such as, for example, a handheld device or handheld computer, including, for example, a personal digital assistant (PDA), or a smart phone such as a Blackberry® or iPhone®, respectively. Furthermore, each of participant devices 111, 115 includes participant client program 114. Participant client program 114 can be any type of software application that allows instantaneous or dynamic transmission of information between participant devices 111, 115 and mobile device 109 or host device 107, in the event the IM messages are transmitted from host device 107 to mobile device 109, based on configurations of host client program 106 of host device 107, in accordance with embodiments of the present invention.

Server device 105 can be for example, a server computer system such as a management server, a web server, or any other electronic device or computing system capable of receiving and sending data, in accordance with an embodiment of the present invention. Server device 105 also represents a "cloud" of computers interconnected by one or more networks, where server device 105 can be a primary server for a computing system utilizing clustered computers when accessed through network 102. For example, a cloud computing system can be an implementation of a collaborative transfer of IM messages over network 102 between host 108 and participants 113, 117, dynamically, in real time.

Server device 105 includes server program 104. Server program 104 performs necessary functions to divert or re-route the IM messages from mobile client program 110 of mobile device 109 to host client program 106 of host device 107. Server program 104 also facilitates IM message communications between host device 107, mobile device 109 and participant devices 111, 115, based wired or wireless IM messaging transmissions between host device 107 and participant devices 111, 115, in accordance with embodiments of the present invention.

Network 102 includes one or more networks of any kind that can provide communication links between various devices and computers connected together within dynamic messenger routing system 100. Network 102 also includes connections, such as wired communication links, wireless communication links, or fiber optic cables. Furthermore, network 102 can be implemented as a number of different types of networks, including, for example, a local area network (LAN), wide area network (WAN) or a packet switched telephone network (PSTN), or some other networked system. Network 102 can include the Internet representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the World Wide Web (the web). Further, content from the Internet is often provided by content servers, including, for example, server device 105 and is transmitted to client display devices, including, for example host device 107 and mobile device 109. At the heart of the Internet is a backbone of high-speed data communication lines between major nodes or host computers, consisting of thousands of commercial, government, educational and other documents that can be transferred in an IM messaging application between host device 107, mobile device 109, and participant devices 111, 115, in accordance with embodiments of the present invention.

Figure 2:
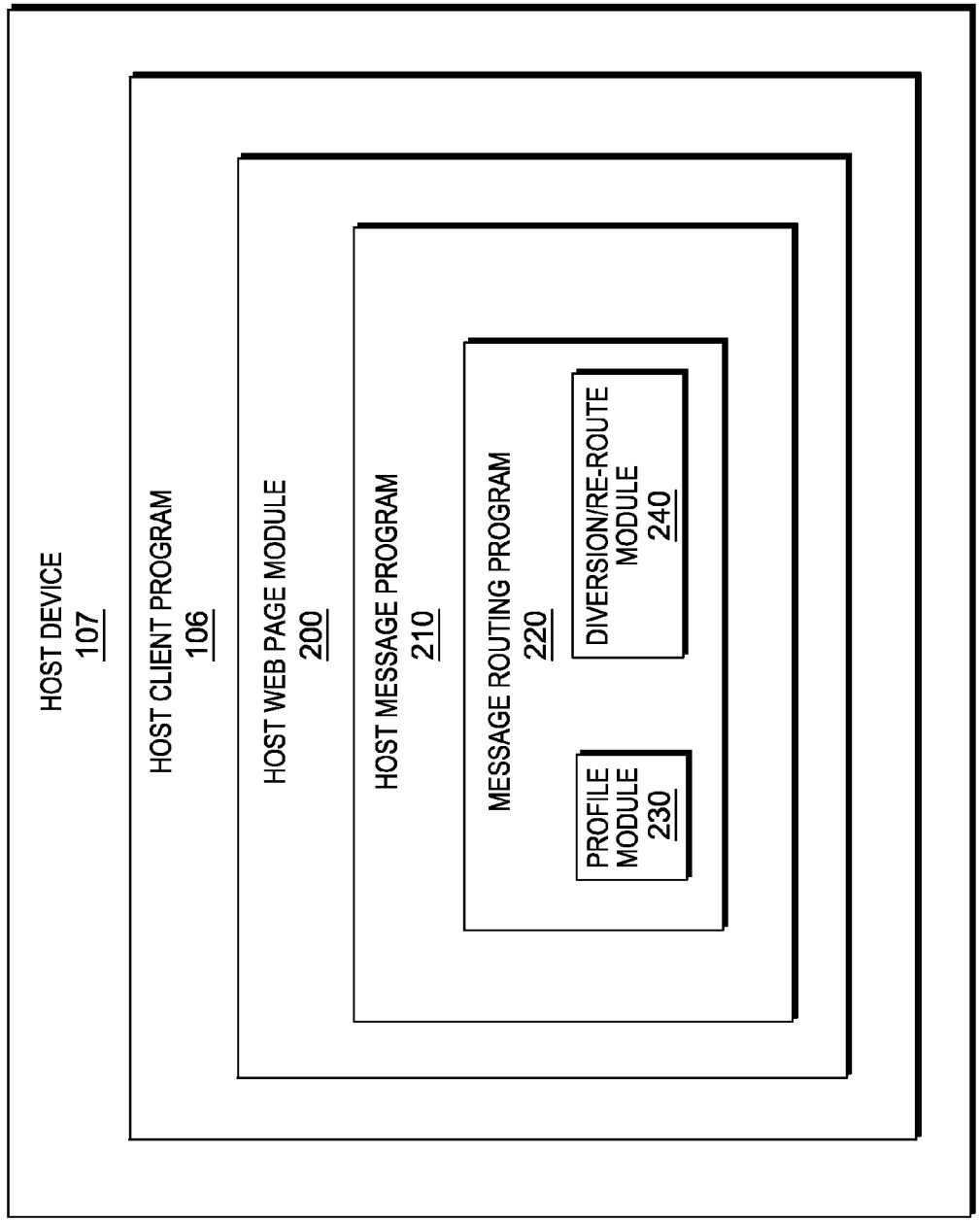
FIG. 2 is a functional block diagram illustrating program components of a host device, in accordance with an embodiment of the present invention.

FIG. 2 is a functional block diagram illustrating components of host device 107, in accordance with an embodiment of the present invention.

Host device 107 comprises host client program 106. Host client program 106 can, among other things, retrieve and display content accessible via network 102, such as web pages containing one or more Instant Message (IM) services. In one embodiment, host client program 106 is a web browser. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively.

The IM service of host client program 106 includes transmission of instant messages between host device 107, mobile device 109, and participant devices 111, 115, over network 102. Moreover, IM messages can be directed to an IM service of host client program 106 with host 108, being identified with a username or other authentication credentials. Host 108 is actively authenticated in the IM service of host client program 106 and/or participant client program 114, before instant messages can be diverted and re-routed between host device 107, mobile device 109, and participant devices 111, 115. Furthermore, host 108 maintains a profile of credentials stored in a database of server device 105 that authenticates the credentials based on information entered in host client program 106 of host device 107. Host client program 106 comprises host web page module 200.

Host web page module 200 is a web browser plugin/add-on that extends the functionality of host client program 106 by adding additional user interface elements to a user interface of host client program 106. The additional user interface allows host 108 to instantaneously transmit information or instant messages between host device 107 and participant devices 111, 115, and manual or automatic diversion or re-routing of the instant messages from host device 107 to mobile device 109 via a host messaging program of host device 109, in accordance with embodiments of the present invention.

Host web page module 200 comprises host message program 210. Host message program 210 is a web browser plugin/add-on that extends the functionality of web page module 200 by adding additional user interface elements to a user interface of host web page module 200. Host message program 210 allows host 108 to manually or automatically divert or re-route instant message via host web page module 200 to a SMS program of mobile client program 110 of mobile device 109, and/or alternatively, divert or re-route the instant message from the SMS program of mobile device 109 to host message program 210 of host device 107. Host message program 210, can be, for example, IBM® Lotus® Sametime® (IBM, Lotus and Sametime are registered trademarks of International Business Machines Corporation in the United States, other countries of both). Host message program 210 comprises message routing program 220.

Message routing program 220 allows host 108 to configure options to divert or re-route instant message (IM) messages from host client program 106 of host device 107 to mobile client program 110 of mobile device 109. In one embodiment, configuration options of message routing program 220, includes host choices that define how to divert or re-route the IM messages from host device 107 to mobile device 109, and/or alternatively from mobile device 109 to host device 107, during IM sessions between host 108 and participants 113, 117, in accordance with embodiments of the present invention. The configuration options further include circumstances or conditions that enable automatic or manual diversion or re-route of instant messages, including, for example, re-routing of IM messages from host device 107 to mobile device 109. The configuration options also include conditions for message handling for each of the configurations, including, for example, allowing specific participants 113, 117 to automatically continue IM messaging sessions with host 108 collaboratively from host device 107 to mobile device 109, based on whether host 108 configures participant's 113, 117 to continue the instant messages from host device 107 to mobile device 109 during instant message sessions hosted between host 108 and participant 113, 117.

Furthermore, if no conditions are defined for a specific participant 113, 117, for example, if host 108 did not configure any conditions or actions to be taken for specific participants 113, 117, IM messages of the non specified participants 113, 117, will not be continued on mobile device 109 in the event that host 108 diverts their IM message to mobile device 109. In this manner, in the event that IM messages are diverted or re-routed to mobile device 109, and the specific participants 113, 117, is not selected or configured to divert IM messages to mobile device 109, the non selected/configured participant 113, 117, will see host as "offline" in participant client program 114 in the event that host 108 diverts or re-routes her IM messages from host client program 106 of host device 107 to mobile client program 110 of mobile device 109.

In one aspect, configuration conditions or options are adapted to allow automatic or manual diversion of the IM messages from host device 107 to mobile device 109 based on one or more mobile phone number of host 108, stored in a database of server device 105, as described in more details below, in accordance with embodiments of the present invention. Furthermore, configurations further include permitted times that designated or selected participants 113, 117 can join IM sessions in the event that the IM sessions are diverted from host device 107 to mobile device 109, and/or from mobile device 109 to host device 107.

Moreover, host 108 can enable or disable diversion of the IM messages in host client program 106. In the event that diversion of IM messages are enabled, host 108 can further enable IM messages to be automatically or manually diverted from host device 107 to mobile device 109. In this context, host 108 can further restrict diversion of messages for specific participants 113, 117 or group of participants 113, 117, in accordance with embodiments of the present invention.

Specifically, message routing program 220 includes profile module 230 and diversion/re-route module 240. Profile module 230 includes a profile for each of host 108 and/or participants 113, 117 engaged in the IM session on host device 107 and participant devices 111, 115. Profile module 230 also includes mobile phone numbers of mobile device 109 pertaining to host 108. Moreover, mobile numbers of the one or more mobile device 109 of host 108 are stored in a database of server device 105 for retrieval, in the event that host desires to divert IM messages to from host device 107 to mobile device 109. In particular, in the event that host desires to divert IM messages to mobile message program, server program 104 of server device 105 recognizes the mobile number in the database, and correlates the number with a profile of host 108. In this manner, server program 104 re-routes the IM messaging sessions from the host device 107 to mobile device 109 based on the mobile number stored in a database of server device. Moreover, permitted participants that are configured on profile module 230 to continue IM sessions with host 108 on mobile device 109 are also enabled to continue the IM message conversations with host 108 on mobile device 109.

Diversion/re-route module 240 allows host 108 to enable or disable diversion of IM messages on host client program to mobile client program of mobile device. For example, during IM sessions, if diversion of IM messages is enabled on diversion/re-route module 240, in the event that host desires to divert messages during the IM sessions hosted between host 108 and participants 113, 117, the IM messages are automatically or manually diverted or re-routed from host device 107 to mobile device 109. In the case of an automatic diversion, host 108 can select an option for automatic diversion of IM messages from host device 107 to mobile device 109 on diversion/re-route module 240.

Moreover, if an automatic diversion is selected, a server program of server device 105 monitors status of host 108 who has enabled the automatic diversion, periodically, random, and/or using event-based monitoring of IM messaging triggering events of host, including, for instance, the IM message status of host, in accordance with embodiments of the present invention. Diversion/re-route module 240 further enables host 108 to restrict specific participants 113, 117 from diverting IM messages to host mobile device. Furthermore, the database of server device 105 also includes profiles of participant 113, 117, including, for example identification of participant 113, 117 whom are permitted to continue conversations with host 108 in the event that IM sessions between host 108 and participant 113, 117 are automatically or manually re-routed from host device 107 to mobile device 109, and/or from mobile device 109 to host device 107, in accordance with embodiments of the present invention. Moreover, host 108 can configure diversion of IM messaging sessions in diversion/re-route module 240 based on suitable times that host desires the IM messages to be diverted from host device 107 to mobile device 109. For example, host 108 can configure diversion/re-route module 240 to divert IM messages from host device 107 to mobile device 109 at specific times, including, for example, 2:00 pm or 3:00 pm, in accordance with embodiments of the present invention.

Profile module 230 further includes configurations on how IM messages should be diverted or transmitted between host device 107 and mobile device 109, and alternatively from mobile device to host device. For example, the IM message are wirelessly transmitted to a server program of server device 105, and relayed to either of host device 107, mobile device 109, and participant devices 111, 115. The server program matches profiles of all phone numbers associated with mobile phone numbers that are configured by host 108 to be diverted in the event that IM messages are diverted to re-routed from host device 107 to mobile device 109. The mobile numbers of the mobile device 109 of host 108 are stored in a database of server device 105 for retrieval, as described below, in accordance with embodiments of the present invention. Furthermore, in one aspect, the server program of server device 105 searches for the mobile number that corresponds with the host or the participant, and relays the IM message via SMS to the mobile device. Host client program 106 transmits configurations options, specifically selected by host 108 in host client program 106 to divert or re-route IM messages from host device to host mobile device to server program of server device 104.

Figure 3:
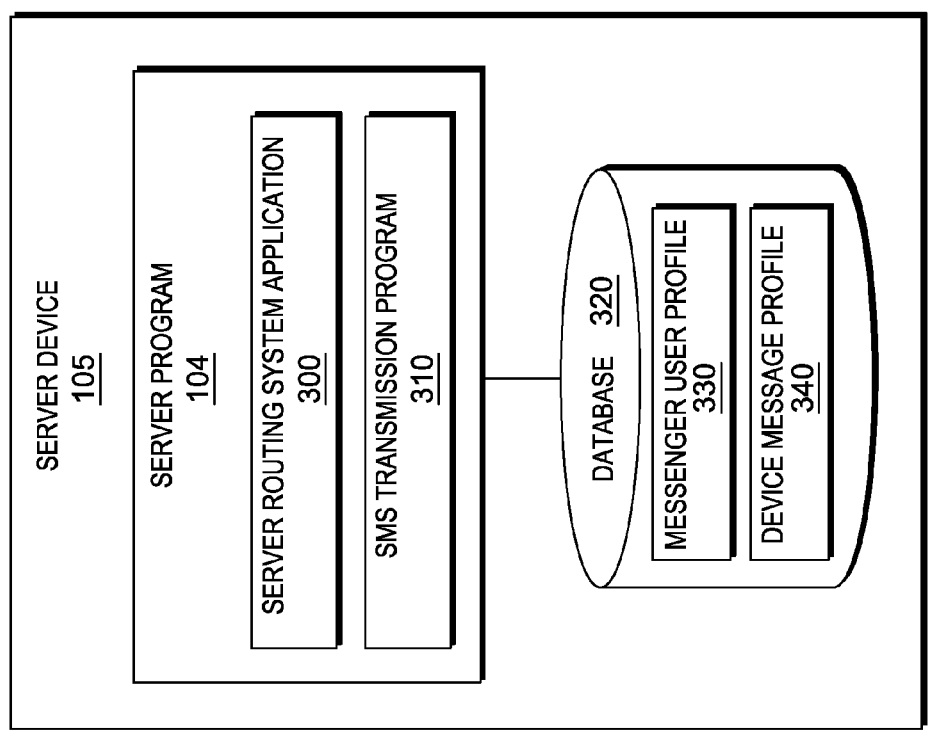
FIG. 3 is a functional block diagram illustrating program components of a server device in accordance with embodiments of the present invention.

FIG. 3 is a functional block diagram illustrating components of server device 105 in accordance with an embodiment of the present invention.

Server program 104 performs all necessary functions to divert or re-route IM messages from host device 107 to mobile device 109 during IM sessions hosted between host device 107 and participant devices 111, 115. Server program 104 further performs functions to divert or re-route the IM messages from the mobile device 109 to the host device 107. In particular, server program 104 facilitates communications between host device 107, mobile device 109 and participant devices 111, 115, based on operations performed by server program 104, in accordance with embodiments of the present invention. Server program 104 comprises server routing system application 300, SMS transmission program 310, and database 320.

Database 320 can be any type of storage device, storage server, storage area network, redundant array of independent discs (RAID), cloud storage device, or any type of data storage that maintains information pertaining to host and participant profiles during IM sessions between host 108 on host client program 106 of host device 107, and participants 113, 117 on participant client program 114 of participant devices 111, 115, and also mobile client program 110 of mobile device 109.

Database 320 can also be a relational database management system (RDBMS), in accordance with embodiments of the present invention. A RDBMS is a database that stores information from documents in a table, and also defines relationships among the information in the table, including, for example, documents, mobile address identifications of either host 108 or participants 113, 117, and/or configurations in host client program 106 of host device 107 pertaining for specifically designated mobile address designations, configured by host 108 in host client program 106 to divert or re-route IM sessions from host device 107 to mobile device 109, for permitted participants 113, 117, and other configurations, as can be defined by host 108 in host client program 106, as described above, in accordance with embodiments of the present invention.

Database 320 includes messenger user profile 330 and device message profile 340. Messenger user profile 330 stores host 108 and participant 113, 117 instant message profiles pertaining to the IM sessions, including, for example, identification or mobile contact list of host 108. The contact list can also include identification or authentication credentials of participant 113, 117 engaged in the IM sessions with host 108. The contact list of host 108 also includes mobile phone directories for one or more host 108 who desires to divert or re-route IM sessions to or from host client program 106 to mobile client program 110 of mobile device 109. Furthermore, the contact list also includes identities of participant 113, 117 whom are permitted to continue IM sessions with host 108, once IM sessions are diverted from host client program 106 to SMS program of mobile client program 110 of mobile device 109, based on configurations enabled or disabled by host 108 in host client program 106 of host device 107.

For instance, in the event that host 108 automatically or manually diverts or re-routes IM sessions from host client program 106 of host device 107 to mobile client program 110, through a SMS connection that is navigated between host device 107, mobile devices 109, server device 105 searches for host profiles, including mobile numbers of mobile device 109 that are associated with host 108. Moreover, in one aspect, mobile connection of server program 104 searches messenger user profile 330 to determine host configurations for handling diversion of IM message sessions from host device 107 to mobile device 109 based on the configurations. As detailed above, configurations for handling diversion or re-routing of IM messages are configured by host 108 in host client program 106 of host device 107.

The profile address is stored in IM profile of database with other profile address, including for example, mobile numbers of additional host or configurations to permit participants to divert or re-route IM message sessions, along with a notation that the IM client is active. In one embodiment, server routing system application 300 examines instant message transmission between host 108 and participants 113, 117 to determine actions that should be taken based on the configurations by host 108 in host client program of host device 107. In one aspect, database 320 includes profiles of all individuals recognized in the IM session on host client program or participant client or mobile client program, including, for example, host 108 and participants 113, 117.

Further, host 108 can update information, including, mobile numbers and participant profiles in host client program 106 of host device 107. Furthermore, the updated information is stored in database 320. The stored information in database 320 includes information pertaining to distinctive credentials of one or more conference presenters. In one aspect, these credentials are utilized by server program 105 to distinguish the one or more conference presenters during a web conference, in accordance with embodiments of the present invention. Device message profile 340 includes a history or record of instant messages transmitted between host device 107, mobile device 109, and participant devices 111, 115. The history or record further includes a record of transmittance of the instant messages diverted or routed between host device 107 and mobile device 109. Server routing system application 300 facilitates transmission of IM messages from host device 107 to mobile device 109 and/or from mobile device 109 to host device 107, based on configurations or conditions defined in host client program 106 of host device 107. In one embodiment, host enables automatic/manual diversion of messages from host device 107, to mobile device 109 in host client program 106, as described above.

In case of an automatic configuration or automatic re-routing of IM messages from host client program 106 to a SMS program of mobile client program 110, server routing system application 300 monitors IM status of IM sessions between host client program 106 and participant client program 114, periodically, random, and/or using event-based monitoring of IM messaging triggering events of host including for example, the IM message status of host 108. Furthermore, if automatic diversion is configured in host client program, mobile server routing system application 300 monitors triggering events of IM message status of host client program 106 of host 108 who has configured/enabled automatic diversion of IM messages from host device 107 to mobile device during IM sessions between host of host device and participant of participant device.

Moreover, if host 108 switches to any of the "trigger" status, on host client program 106, including for example, away, off-line, do not disturb etc., server routing system application 300 filters which participants 113, 117 are informed of such status in participant client program 114 of participant devices 111, 115 based on whether participants 113, 117 are configured by host 108 to be informed of such status. Therefore, permitted participants whose IM sessions with host 108 are automatically or manually re-routed or diverted to a SMS program of mobile client program 110 of mobile client device 109, will continue to see IM session status of host 108 as available when the IM sessions are re-routed from host client program 106 of host device 107. On the other hand, participants 113, 117 whom are not enabled or permitted by host 108 of view IM session status during the IM sessions, will be notified or see actual IM status of host 108 on participant client program 114 as "off-line" or "unavailable".

In the case of a manual diversion or redirection, which is configured in host client program 106 by host 108 to allow one or more host to enable "turn on" or disable "turn off" manual diversion or re-direction of IM messages during IM sessions between host 108 and participants 113, 117, host 108 can manually enable or "turn on" re-directing of permitted users to continue instant message sessions on mobile device 109. In particular, in the event that manual diversion or re-routing is enabled, participants 113, 117 whom are configured to be enabled for diversion or re-routing of IM messages from host device 107 to mobile device 109, are re-routed from host device 107 to mobile device 109 based on the permitted configuration. For example, if host 108 steps away from the IM session, or goes to lunch for example, host 108 can manually select disable or "turn off" manual diversion or re-direction of IM sessions to a SMS program of mobile client program 110 of mobile device 109.

SMS transmission program 310 controls the transmission of IM messages of host client program 106 of host device 107 to a SMS of mobile client program 110 of mobile device 109, in the event the IM sessions of the host client program 106 are diverted from host device 107 to mobile device 109. In one aspect, SMS is a text messaging service component server program 104 of server device 105, using standardized communications protocols that allow the exchange of short text messages between host device 107 and mobile device 109. SMS transmission program 310 further controls the transmission SMS of mobile client program 110 of mobile device 107 to host client program 109 of host device 107, in the event that IM messages are transmitted from mobile device to host device, in accordance with embodiments of the present invention.

Figure 4:
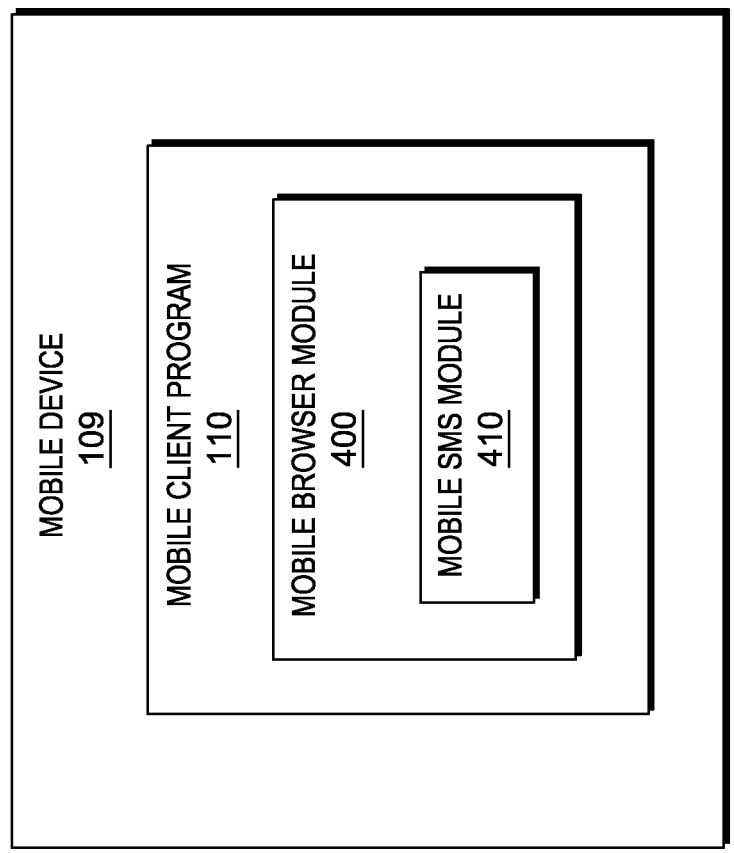
FIG. 4 is a functional block diagram illustrating program components of a mobile device in accordance with embodiments of the present invention.

FIG. 4 is a functional block diagram illustrating components of mobile device 109, in accordance with an embodiment of the present invention.

Mobile device 109 comprises mobile client program 110. Mobile client program 110 can, among other things, retrieve and display content accessible via network 102, such as web pages containing one or more Instant Message (IM) services. In one embodiment, participant client program 114 is a web browser. Mobile client program 110 comprises mobile browser module 400. Mobile browser module 400 is a web browser plugin/add-on that extends the functionality of mobile client program 110 by adding additional user interface elements to a user interface of mobile browser module 400. The additional user interface of participant mobile browser module 400 allows host 108 to instantaneously transmit information or instant messages between host device 107 and participant devices 111, 115, and/or mobile device 109 based on configurations to divert or re-route instant messages from host device 107 to mobile device 109, in accordance with embodiments of the present invention. Mobile browser module 400 comprises mobile SMS module 410. Mobile SMS module 410 is a SMS program that controls transmission of IM messages from host client program 106 of host device 107 and to mobile client program 110 of mobile device 109, in the event the IM sessions of the host client program 106 are diverted from host device 107 to mobile device 109.

Figure 5:
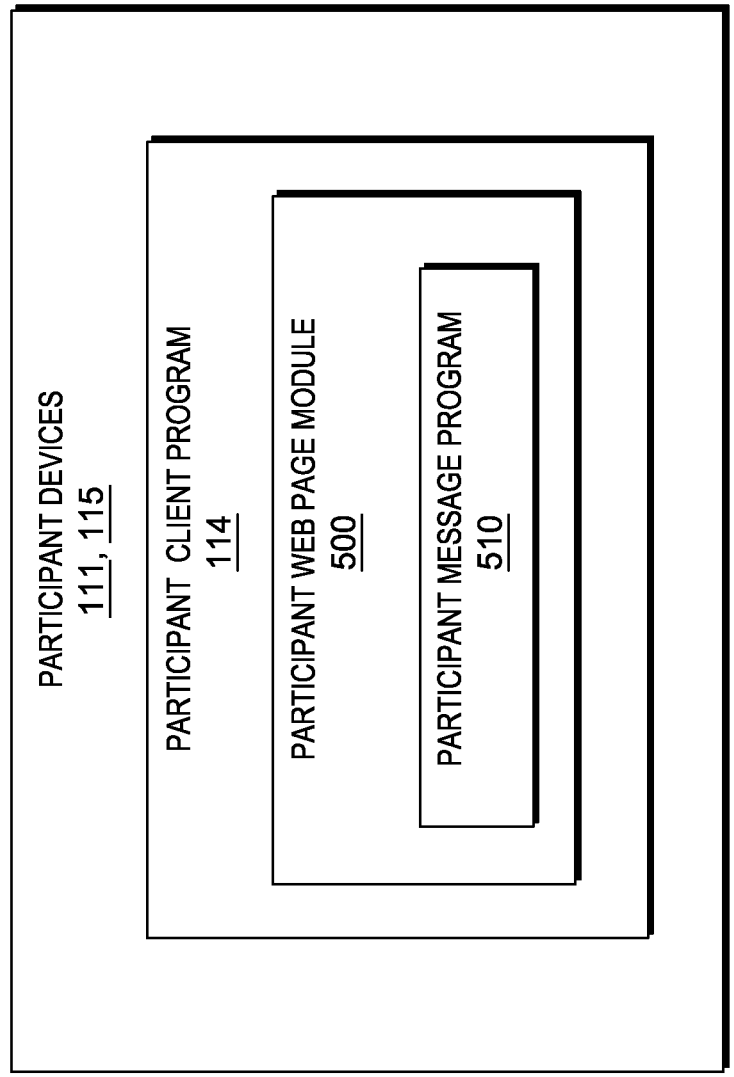
FIG. 5 is a functional block diagram illustrating program components of a participant device in accordance with embodiments of the present invention.

FIG. 5 is a functional block diagram illustrating components of participant devices 111, 115, in accordance with an embodiment of the present invention.

Participant devices 111, 115 comprises participant client program 114. Participant client program 114 can, among other things, retrieve and display content accessible via network 102, such as web pages containing one or more Instant Message (IM) services. In one embodiment, participant client program 114 is a web browser. Participant client program 114 comprises participant web page module 500. Participant web page module 500 is a web browser plugin/add-on that extends the functionality of participant client program 114 by adding additional user interface elements to a user interface of participant client program 114. The additional user interface of participant web page module 500 allows transmission of information by sever device 105, between participant devices 111, 115 and host device 107, in the event that host 108 configures the transmission of instant messages from host client program 106 of host device 107 to mobile client program 110 of mobile device 109. In one aspect, the participant client program 114 of participant devices 113,117 does not do any re-routing and is not aware that re-routing is even happening. Participant client program 114 continues to send messages to server program 104 of server device 105 and the serve 105 handles the re-routine based the configurations by host 108 on host client program 106. Participant web page module 500 comprises participant message program 510. Participant message program 510 is a web browser plugin/add-on that extends the functionality of participant web page module 500 by adding additional user interface elements to a user interface of participant client program 114. In particular, participant message program 510 allows transmission of instant messages between one or more computing devices, including, for example, host device 107, mobile device 109, and participants devices 113, 117, in accordance with embodiments of the present invention.

Figure 6:
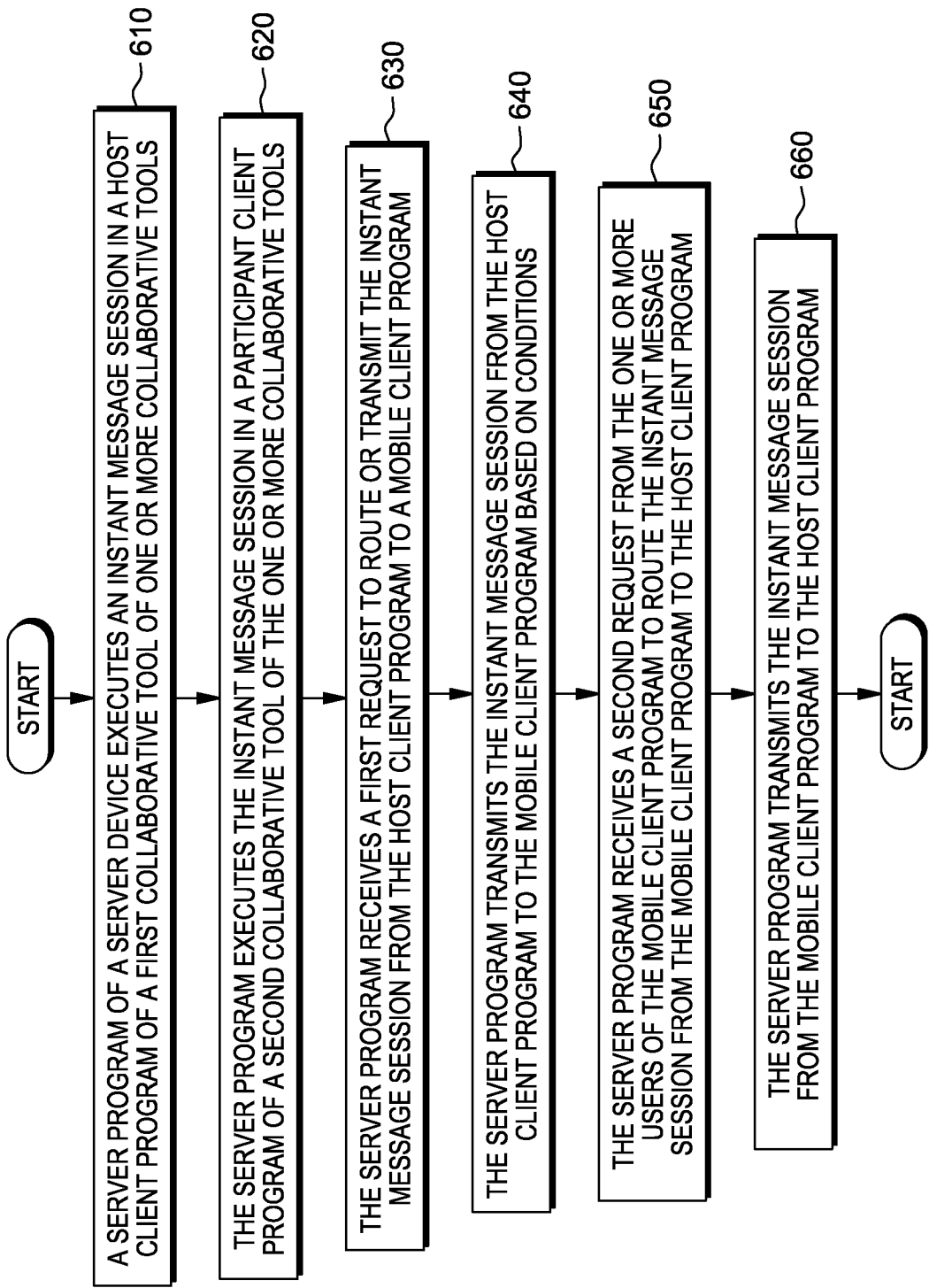
FIG. 6 is a flowchart depicting steps performed by a server program of a server device in accordance with embodiments of the present invention.

FIG. 6 is a flowchart depicting the step performed by server program 104 of server device 105 of FIG. 1, in accordance with embodiments of the present invention.

In step 610, server program 104 executes an instant message session in host client program 106 of host device 107 between host 108 and participants 113, 117. In one aspect, host device 107 and participant devices 113, 117, are collaborative tools that are adapted to transmit instant messages during instant message sessions, conducted between for example, host 108, and participants 113, 117. In step 620, server program 104 executes the instant message session in participant client program 114 of participant devices 113, 115. In step 630, server program 104 receives a first request to route or transmit the instant message session from host client program 106 of host device 107 to mobile client program 110 of mobile device 109. In step 640, server program 104 transmits the instant message session from host client program 106 to mobile client program 110 based on the first request. In step 650, server program 104 receives a second request to transmit the instant message session from mobile client program 110 to host client program 106. In step 660, server program 104 transmits the instant message session from mobile client program 110 to host client program 106, based on the second request.

Figure 7:
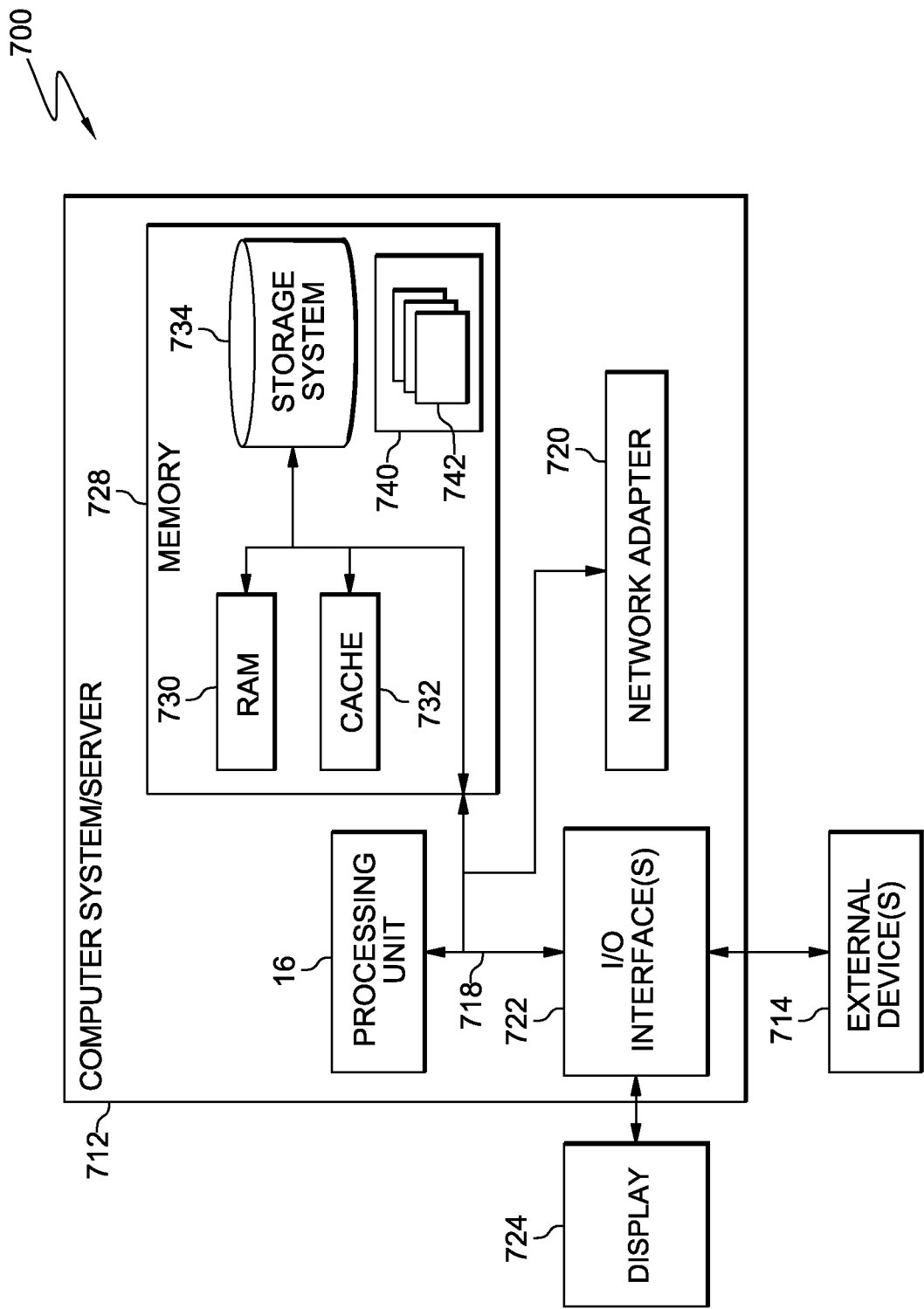
FIG. 7 illustrates a block diagram of components of a computer system in accordance with embodiments of the present invention.

FIG. 7 is a functional block diagram of a computer system, in accordance with the embodiment of the present invention.

Computer system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In computer system 700 there is computer 712, which is operational with numerous other general purpose or special purpose computing system environments or configurations. Examples of well-known computing systems, environments, and/or configurations that can be suitable for use with computer 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of host device 107, mobile device 109, and participant devices 111, 115 can include or can be implemented as an instance of computer 712.

Computer 712 can be described in the general context of computer system executable instructions, such as program modules, being executed by a computer system. Generally, program modules can include routines, programs, objects, components, logic, data structures, and so on that perform particular tasks or implement particular abstract data types. Computer 712 can be practiced in distributed cloud computing environments where tasks are performed by remote processing devices that are linked through a communications network. In a distributed cloud computing environment, program modules can be located in both local and remote computer system storage media including memory storage devices.

As further shown in FIG. 7, computer 712 is shown in the form of a general-purpose computing device. The components of computer 712 can include, but are not limited to, one or more processors or processing units 716, memory 728, and bus 718 that couples various system components including memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 712 typically includes a variety of computer system readable media. Such media can be any available media that is accessible by computer 712, and includes both volatile and non-volatile media, and removable and non-removable media.

Memory 728 includes computer system readable media in the form of volatile memory, such as random access memory (RAM) 730 and/or cache 732. Computer 712 can further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 can include at least one program product having a set (e.g., at least one) of program modules that are configured to carry out the functions of embodiments of the invention.

Host client program 106, mobile client program 110, and participant client program 114 can be stored in memory 728 by way of example, and not limitation, as well as an operating system, one or more application programs, other program modules, and program data. Each of the operating system, one or more application programs, other program modules, and program data or some combination thereof, can include an implementation of a networking environment. Program modules 742 generally carry out the functions and/or methodologies of embodiments of the invention as described herein. Each one of host client program 106, mobile client program 110, and participant client program 114 are implemented as or are an instance of program 740.

Computer 712 can also communicate with one or more external devices 714 such as a keyboard, a pointing device, etc., as well as display 724; one or more devices that enable a user to interact with computer 712; and/or any devices (e.g., network card, modem, etc.) that enable computer 712 to communicate with one or more other computing devices. Such communication occurs via Input/Output (I/O) interfaces 722. Still yet, computer 712 communicates with one or more networks such as a local area network (LAN), a general wide area network (WAN), and/or a public network (e.g., the Internet) via network adapter 720. As depicted, network adapter 720 communicates with the other components of computer 712 via bus 718. It should be understood that although not shown, other hardware and/or software components can be used in conjunction with computer 712. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention can be embodied as a system, method or computer program product. Accordingly, embodiments of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, embodiments of the present invention can take the form of a computer program product embodied in one or more computer-readable medium(s) having computer-readable program code embodied thereon.

In addition, any combination of one or more computer-readable medium(s) can be utilized. The computer-readable medium can be a computer-readable signal medium or a computer-readable storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium can be any tangible medium that contains, or stores a program for use by or in connection with an instruction execution system, apparatus, or device.

A computer-readable signal medium can include a propagated data signal with computer-readable program code embodied therein, for example, in baseband or as part of a carrier wave. Such a propagated signal can take any of a variety of forms, including, but not limited to, electro-magnetic, optical, or any suitable combination thereof. A computer-readable signal medium can be any computer-readable medium that is not a computer-readable storage medium and that communicates, propagate, or transport a program for use by or in connection with an instruction execution system, apparatus, or device.

Program code embodied on a computer-readable medium can be transmitted using any appropriate medium, including but not limited to wireless, wireline, optical fiber cable, RF, etc., or any suitable combination of the foregoing. Computer program code for carrying out operations for embodiments of the present invention can be written in any combination of one or more programming languages, including an object oriented programming language such as Java, Smalltalk, C++ or the like, conventional procedural programming languages such as the "C" programming language, a hardware description language such as Verilog, or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for routing instant messages between collaborative tools within a computer system has been described. However, numerous modifications and substitutions can be made without deviating from the scope of the present invention. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the Figures. Therefore, the present invention has been disclosed by way of example and not limitation.

What is claimed is:

1. A method for routing instant messages between collaborative tools within a computer system, the method comprising the steps of:

executing an instant message session in a host message program of a first collaborative tool;

executing the instant message session in a participant message program of a second collaborative tool;

receiving a first request from a user of the host message program to route at least one instant message of the instant message session from the host message program to a mobile message program of a third collaborative tool, the at least one instant message is conveyed in the mobile message program before the first request to route one or more instant messages of the instant message session from the host message program to a mobile message program of the third collaborative tool, wherein the third collaborative tool comprises a history of instant message conveyed during the instant message sessions;

transmitting the at least one instant message of instant message session from the host message program and the participant message program to the mobile message program based on conditions defined in the host message program, the conditions including at least one of messaging diversion controls, including: enabling or disabling diversion of the instant message sessions between collaborative tools, controlling automatic or manual diversion or re-routing of the instant message sessions, controlling diversion of instant message sessions of one or more permitted mobile numbers, controlling diversion of instant message sessions based on permitted times, controlling diversion of instant message sessions for specific users or groups of users, and controlling diversion of the instant message sessions based on status of the one or more users of the host message program or the mobile message program;

receiving a second request from a user of the mobile message program to route the at least one instant message of the instant message session from the mobile message program to the host message program, wherein the instant message session is continued on the host message program;

conveying the instant messages of the instant message sessions to a host computer device of the collaborative tools before the second request to route one or more instant messages of the instant message session between the collaborative tools so that the host computer device of the collaborative tools comprises a history of instant message conveyed during the instant message sessions; and transmitting the at least one instant message of the instant message
session from the mobile message program to the host message program and the participant message program based on the second request.

2. The method according to claim 1, wherein the user includes at least one host of the host client program or at least one participant of the participant client program engaged in the instant message session, wherein transmission of the instant messages from the host message program controlled by the at least one host in the host message program.

3. The method according to claim 2, wherein the one or more participants of the participant message program are unaware of the transmission of the instant messages from the host message program and the participant message program to the mobile message program or transmission of the instant message from the mobile message program to the host message program.

4. The method according to claim 1, wherein the collaborative tools are mobile devices or computing devices, and wherein the mobile devices communicate during the instant message session using a short message service.

5. A computer system for routing instant messages between collaborative tools, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to execute an instant message session in a host message program of a first collaborative tool;

program instructions to execute the instant message session in a participant message program of a second collaborative tool;

program instructions to receive a first request from a user of the host message program to route at least one instant message of the instant message session from the host message program to a mobile message program of a third collaborative tool, the at least one instant message is conveyed in the mobile message program before the first request to route one or more instant messages of the instant message session from the host message program to a mobile message program of the third collaborative tool, wherein the third collaborative tool comprises a history of instant message conveyed during the instant message session;

program instructions to transmit the at least one instant message of instant message session from the host message program and the participant message program to the mobile message program based on conditions defined in the host message program, the conditions including at least one of messaging diversion controls, including: enabling or disabling diversion of the instant message sessions between collaborative tools, controlling automatic or manual diversion or re-routing of the instant message sessions, controlling diversion of instant message sessions of one or more permitted mobile numbers, controlling diversion of instant message sessions based on permitted times, controlling diversion of instant message sessions for specific users or groups of users, and controlling diversion of the instant message sessions based on status of the one or more users of the host message program or the mobile message program;

program instructions to receive a second request from a user of the mobile message program to route the at least one instant message of the instant message session from the mobile message program to the host message program, wherein the instant message session is continued on the host message program;

conveying the instant messages of the instant message sessions to a host computer device of the collaborative tools before the second request to route one or more instant messages of the instant message session between the collaborative tools so that the host computer device of the collaborative tools comprises a history of instant message conveyed during the instant message sessions; and program instructions to transmit the at least one instant message of the instant message session from the mobile message program to the host message program and the participant message program based on the second request.

6. The computer system according to claim 5, wherein the user includes at least one host of the host client program or at least one participant of the participant client program engaged in the instant message session, wherein transmission of the instant messages from the host message program controlled by the at least one host in the host message program.

7. The computer system according to claim 6, wherein the one or more participants of the participant message program are unaware of the transmission of the instant messages from the host message program and the participant message program to the mobile message program or transmission of the instant message from the mobile message program to the host message program.

8. The computer system according to claim 5, wherein the collaborative tools are mobile devices or computing devices, and wherein the mobile devices communicate during the instant message session using a short message service.

9. A computer program product for routing instant messages between collaborative tools, the computer program product comprising:
one or more computer-readable storage memory device and program instructions stored on the one or more computer-readable storage memory device, the program instructions comprising:
program instructions to execute an instant message session in a host message program of a first collaborative tool;
program instructions to execute the instant message session in a participant message program of a second collaborative tool;
program instructions to receive a first request from a user of the host message program to route at least one instant message of the instant message session from the host message program to a mobile message program of a third collaborative tool, the at least one instant message is conveyed in the mobile message program before the first request to route one or more instant messages of the instant message session from the host message program to a mobile message program of the third collaborative tool, wherein the third collaborative tool comprises a history of instant message conveyed during the instant message session;
program instructions to transmit the at least one instant message of instant message session from the host message program and the participant message program to the mobile message program based on conditions defined in the host message program, the conditions including at least one of messaging diversion controls, including: enabling or disabling diversion of the instant message sessions between collaborative tools, controlling automatic or manual diversion or re-routing of the instant message sessions, controlling diversion of instant message sessions of one or more permitted mobile numbers, controlling diversion of instant message sessions based on permitted times, controlling diversion of instant message sessions for specific users or groups of users, and controlling diversion of the instant message sessions based on status of the one or more users of the host message program or the mobile message program;
program instructions to receive a second request from a user of the mobile message program to route the at least one instant message of the instant message session from the mobile message program to the host message program, wherein the instant message session is continued on the host message program;
conveying the instant messages of the instant message sessions to a host computer device of the collaborative tools before the second request to route one or more instant messages of the instant message session between the collaborative tools so that the host computer device of the collaborative tools comprises a history of instant message conveyed during the instant message sessions; and
program instructions to transmit the at least one instant message of the instant message session from the mobile message program to the host message program and the participant message program based on the second request.

10. The computer program product according to claim 9, wherein the user includes at least one host of the host client program or at least one participant of the participant client program engaged in the instant message session, wherein transmission of the instant messages from the host message program controlled by the at least one host in the host message program.

11. The computer program product according to claim 10, wherein the one or more participants of the participant message program are unaware of the transmission of the instant messages from the host message program and the participant message program to the mobile message program or transmission of the instant message from the mobile message program to the host message program.

* * * * *